United States Patent [19]

Anvret et al.

[11] Patent Number: 5,307,411
[45] Date of Patent: Apr. 26, 1994

[54] MEANS FOR IDENTIFICATION AND EXCHANGE OF ENCRYPTION KEYS

[75] Inventors: Lena Anvret, Upplands Väsby, Sweden; László Mersich, Madrid, Spain

[73] Assignee: Televerket, Farsta, Sweden

[21] Appl. No.: 943,671

[22] Filed: Sep. 11, 1992

[30] Foreign Application Priority Data

Sep. 12, 1991 [SE] Sweden ............... 91026419

[51] Int. Cl.$^5$ ............................................. H04K 1/00
[52] U.S. Cl. .................................... 380/25; 380/21; 380/23; 380/30
[58] Field of Search ............. 380/18, 21, 22, 30, 380/23, 24, 25, 49, 50

[56] References Cited

U.S. PATENT DOCUMENTS

| | | |
|---|---|---|
| 4,453,074 | 6/1984 | Weinstein . |
| 4,549,075 | 10/1985 | Saada et al. ............... 380/24 X |
| 4,885,777 | 12/1989 | Takaragi et al. ............... 380/30 |
| 4,985,920 | 1/1991 | Seki ............... 380/23 |
| 4,995,082 | 2/1991 | Schnorr ............... 380/23 |
| 5,007,084 | 4/1991 | Materna et al. ............... 380/24 |
| 5,014,312 | 5/1991 | Lisimaque et al. ............... 380/25 |
| 5,048,085 | 9/1991 | Abraham et al. ............... 380/23 |
| 5,227,613 | 7/1993 | Takagi et al. . |

FOREIGN PATENT DOCUMENTS 0379333 7/1990 European Pat. Off. .
0438930 7/1991 European Pat. Off. .

*Primary Examiner*—Tod R. Swann
*Attorney, Agent, or Firm*—Oblon, Spivak, McClelland, Maier & Neustadt

[57] ABSTRACT

The invention relates to a means for identification and exchange of encryption keys between communicating apparatuses for encrypted transmissions. The means comprises a card reader for smart cards connected to the communication apparatus which may be a telecommunication apparatus, e.g. of telephone or facsimile type. The reader can communicate with another reader at a called telecommunication apparatus. For identification and exchange of encryption keys the required calculations are performed by the reader or the smart card using data stored on the smart card in a protected field with limited access. The means enable intercommunication between products of different makes owing to a standard identification procedure and exchange of encryption keys.

7 Claims, 1 Drawing Sheet

MEANS FOR IDENTIFICATION AND EXCHANGE OF ENCRYPTION KEYS

FIELD OF THE INVENTION

The present invention relates to means for identification and exchange of encryption keys between two communicating apparatuses for encrypted transmissions, comprising readers connected to the communication apparatuses. Each reader contains a reader unit which together with software is capable of handling smart cards. The reader can communicate with another reader in the other communication apparatus. The means includes a built-in keyboard for inputting of data.

STATE OF THE ART

Existing products for encryption, facsimile apparatuses, telephone, etc., often follow standards with respect to communication and algorithms, but exclude intercommunication between two products of different makes. A cheap accessory for these and new products would enable different makes to intercommunicate through a standard identification procedure and exchange of encryption keys. In addition, modern smart cards may be used in the procedures enabling strong algorithms and enhanced security.

SUMMARY OF THE INVENTION

The present invention provides a means for identification and exchange of encryption keys between two communicating apparatuses for encrypted transmissions According to the invention a reader for smart cards is connected to each communication apparatus. The required calculations are performed by the reader or the smart card using data stored on the smart card in a proctected field with limited access.

Preferably the communication apparatus is a facsimile apparatus or a telephone.

Further embodiments of the invention are set forth in detail in the accompanying claims.

BRIEF DESCRIPTION OF THE DRAWINGS

The invention will now be described in detail with reference to the accompanying drawings in which the figure is a block diagram of the means according to the invention connected in a network.

DETAILED DESCRIPTION OF THE PREFERRED EMBODIMENTS OF THE INVENTION

Figure 1:
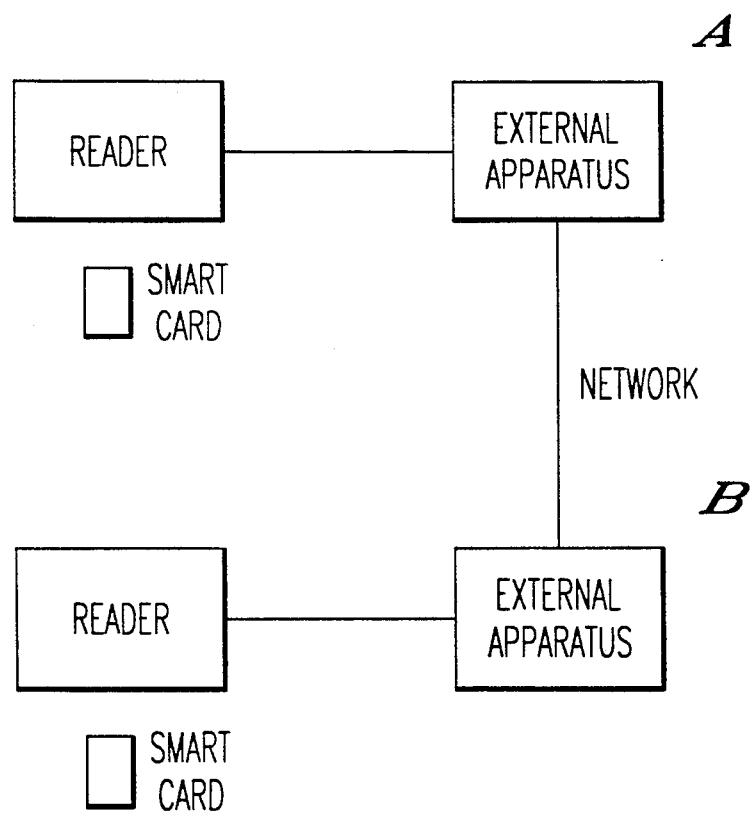

In the figure the means according to the invention is shown connected in a network, e.g. a telecommunication system. Between the external apparatuses exist encrypted traffic. The external apparatuses may be telephone or facsimile apparatuses. For identification and exchange of encryption keys two card readers are used communicating with each other. As a basis for the identification two smart cards are used which means that the identification is performed by the card (and its owner) and that the reader as such does not contain anything confidential.

The reader may be connected in parallel with a telephone to an ordinary telephone jack via a standard intermediate plug (not shown). The reader contains a reader unit that, together with software functions, is capable of handling smart cards. The reader can communicate through dualtone multifrequency (DTMF) signalling or be use of modem. In addition, it has a built-in keyboard for data input. The control of the reader is performed through anyone of the two communication channels available, using DTMF signalling or modem.

It is also possible to intergrate the telecommunication apparatus and the card reader into a unit. In this case the unit has a single keyboard and a slot for inserting the smart card.

The reader is controlled by a central unit. It is an eight bit central processing unit built for maximal integration of the function of the card reader directly in the central unit. The central unit is made with CMOS technology warranting a low current consumption. Internally there is random excess memory RAM having 256 bytes which is sufficient for the functions to be performed by the reader. The machine code may be stored in a programmable read-only memory PROM or mask programmed directly in the central unit to minimize the current consumption and the price.

The card reader is equipped with a built-in keyboard containing 12 keys: the digits 0–9 and the characters * and #. The appearance corresponds to keyboards of ordinary telephones. The keyboard is connected directly to the central unit eliminating the risk of leakage of input information.

The reader unit as such is intended for mounting directly on the circuit board which is important to minimize the overall size and price of the construction. The reader unit is adapted for handling all smart cards in the market. The reader unit is totally passive and is only a link between the card and the central unit. Via the reader unit the central unit can communicate with the card and assist with current supply and clock. Various supply voltages and clock frequencies are supplied to the card in dependence of which card is connected.

The basic communication is achieved using DTMF signalling. The reader is provided with both DTMF transmitter and receiver. The transfer rate is normally 10 characters (10×4 bits) per second. The DTMF receiver is connected in parallel with the ordinary telecommunication traffic which means that it can receive data both from the user's telephone and from the telecommunication network.

Since DTMF signalling sets large limitations in the amount of data which can be transferred the reader is also equipped with a built-in modem. The modem can handle communication according to CCITT V.21 and V.23, resulting in a transfer rate ranging to 1200 bps. This provides a greater flexibility with respect to the functions to be performed by the reader.

The reader is also fitted with a number of light-emitting diodes (LED) in various colours, the functions of which will be described below.

The reader is constructed from low current consumption components but the most current consuming component is the smart card. Since various cards will be used no exact current consumption can be calculated. Additionally, the cards consume more current when they are written so that the current consumption varies with time. The current supply is provided by a battery or a battery eliminator. With a 9 V alkaline battery a continuous operation of the reader of approximately 3–4 hours is achieved. One of the above-mentioned light-emitting diodes indicates low battery voltage and need for change of battery.

When a card is inserted into the reading unit of the reader the reader is started automatically. When the card is pulled out the reader is switched off. Since smart cards are dependent on a current supply from the reader they will return to idle mode when pulled out of the reader unit. When the reader is started by inserting a card in the reader unit a yellow light-emitting diode is lighted. The reader tests the card to identify the type of smart card being used. If a card is accepted the yellow LED is switched off and the reader is ready for use. This means that the reader proceeds to listen for DTMF signals sent from the called system. If the reader does not recognize the card as one of the accepted types the card is of an unknown type or turned the wrong way. Then a red LED is lighted and the reader waits for the card to being pulled out. All calls to the reader will then only give an error message as response.

Using the keyboard the user can input data locally to the reader. The inputted information may then be used as data for a command to the card. The most common type of inputted information is a personal code which is to be tested in the card, but can also be another type of data, e.g. information to be encrypted. None of the operations on the keyboard will be sent in clear text on the telephone line. The reader accepts input from the keyboard after a command from the called system. When this is about to happen a green LED is lighted to indicate that the data is to be input. The input is terminated with "#" and the green LED is switched off. When the LED is switched off no manipulations on the keyboard will either be stored or sent on the line.

In a connected mode the reader listens continuously on the data in the form of DTMF signals or via the modem being sent from the called system. When a start character is detected the reader perceives this as a start of a command. The telecommunication apparatus is then disconnected from the line and the reader goes to a command mode. The reader now collects all data through the signal "#" indicating end of command. If there is a delay of more than one second between the various character the command is considered lost and the reader returns to search for the start character. When the whole command is received it will be decoded and performed. After the command is performed the reader always sends back a response. Thereafter the telephone is again connected to the line and the reader returns to listening. However, when the modem is connected the user will always be disconnected from the line. From the moment the reader has detected the start character until the reader has sent the whole response the yellow LED will be lighted.

The reader always begins in DTMF mode, i.e. it listens for DTMF signals from the called system. By means of a command it is possible to change communication channel and instead connect the modem. Thus, there is a number of various operation modes: DTMF signalling and signalling with a modem with various transfer rates. The operation mode of the modem can be changed during ongoing modem traffic by means of a new command on the modem line. This enables e.g. a change between 1200/75 bps as transmission rate. The response to the command will always be issued on the communication channel on which the command was sent, DTMF or modem. The change of communication channel or operation mode of the modem will not occur until after the response has been transmitted.

By sending a command the reader can be requested to accept data from the user via the keyboard. The green LED is lighted to indicate that input is to be performed on the keyboard. The input is terminated by the user depressing the character #. The green LED is switched off when the input is terminated. The user has maximally 30 seconds to input data. If the input is not terminated within this time period instead an error code is returned. This command is normally used to accept the personal code which is to be used for opening the card connected.

A command may be sent directly to the card connected. The reader awaits a response from the card and then returns it. The reader waits maximally 30 seconds for a response. After this time period instead an error code is returned. The reader only investigates the length of the command as a controll that sufficient data has been transmitted. Besides this no check of the command is performed. It is the task of the calling system to see to it that the command follows the specification of the connected card.

If data has been inputted from the keyboard this may be sent to the connected card using a special command. The input data is stored in a buffer of the keyboard and is transmitted together with the command to the card. Also in this case only the length of the data is checked in the keyboard buffer. The software of the card reader is designed so that two readers can communicate with each other, and the reader is provided with a serial port. This serial port is used to deliver the result of the identification and the exchange of encryption keys to the external unit. In other words, the reader is not used to perform the encryption as such but only for the exchange of keys.

The means should be capable of performing identification of both parties in a communication and should additionally genereate encryption keys exchanged between the systems. Identities and encryption keys are then delivered to the external apparatus for use. The external apparatus communicates with the card reader via an ordinary asynchronous serial port. The card reader is controlled via this interface to perform identification. The identity and the encryption key are also delivered here. The identity of the user (the apparatus) is stored in smart card. This card is protected by a password which is declared using the keyboard of the card reader. The card is also used in calculating and testing the identity.

Every user gets a pair of keys, one open and one secret key in accordance with RSA (Rivest-Shamir-Adleman). These keys are then used for identification and exchange of keys. According to RSA the keys are preferably chosen in the manner below.

Every user selects himself two large prime numbers p and q and calculates $n=pq$. From the range $[\max(p,q)+1, n-1]$ a new number d is chosen and thereafter the number e is calculated. These two new numbers are to be used together with n in encryption and decryption. d should be a prime number and is selected according to certain criteria, wherein the selection has an importance for the strength of the algorithm. e is calculated as $e=\text{inv}(d,\phi(n)+)$ ($+=$ totient function). d and e then gives the two functions $M=C^d$ mod n and $C=M^e$ mod n, where M is a plain message and C is the encrypted correspondence thereof. Together this means $M=C^d \mod n = (M^e \mod n)^d \mod n = M^{ed} \mod n = \ldots = M$, i.e. the two functions are inverses of each other. This means that one key (function) for encryption and another for decryption are used. This is usually called asymmetric encryption.

The above two functions may be denoted as $C=E(M)$ and $M=D(C)$, where E and D are the individual users encryption and decryption transformations, respectively (or vice versa). E may be handed out, while D must be kept secret. Both these transformations (keys) are stored in the smart card of the user. Additionally, D is stored in a way which excludes copying.

In addition, two system constants, a and q, are stored on the smart card. a is a random number and q is a strong prime number ($q=2p+1$, where p is a prime number). These two constants are used in calculating the key of the secondary encryption (see below).

Every user has a card reader certificate, a digital identification. This certificate consists of four text fields, separated by semicolons. The entire certificate is stored on the user's smart card. The four fields are:

Identity: A string of any length consisting of alphanumeric characters.

Public RSA key. This is in turn two fields, e and n (as mentioned above). These two fields are stored as long hexadecimal numbers, separated by a comma.

Validity date of certificate: This is a text field with the form yyyy-mm-dd.

A signature of the above: A hexadecimal number calculated as shown below.

A user's certificate is signed at a certification authority possessing two own transformations $D_S$ and $E_s$, as shown above. $E_S$ is generally known and resides in our case in the user's smart card. $D_S$ is extremely secret, since $D_S$ is used to generate signatures for all cards If someone other than the authority would use $D_S$ the whole reliability of the identification is lost. Therefore, $D_S$ is stored in a special smart card and is protected by a password. $D_S$ can never be read, but can only be used by the proprietor of the password. This protection is today the best allowed by technology.

A user, e.g. A, registers with the authority and receives a signature $S_A=D_S$ (MD(the user's certificate)). MD is a "Message Digest" function compressing the field in the certificate (excluding the signature field) to a short number. This function is used to limit the calculation need of long (heavy) numbers. The signature received can then be verified by everybody knowing $E_S$ and is a proof of authenticity for the user's identity and public key The signature is stored in the user's smart card together with the rest of the certificate.

When the user A contacts user B they start with exchanging the respective identities, public keys as well as their signatures (certificates). Then A tests whether B and $E_B$ belong together by testing the signature $S_B$, i.e. if ES $(S_B)$=MD (B's certificate). B does the same thing. In this way it is possible to learn if the claimed identity and the public key belong together.

A and B then select a random number each which is transmitted in plain text. The opposite party encrypts this using its secret key, i e. $X=D(R)$, where R is the random number and X is the result. The result of the encryption is then retransmitted, and the respective reader decrypts this with the public key of the other reader which was in the transmitted certificate. If the random number reappears after the decryption, one of the readers knows that the other reader is the proprietor of the public key, which was in the certificate. Since the certificate has been proven to belong to the alleged identity also the identity has now been verified.

The last step is exchanging the encryption keys. Each user generates a random number X and calculates $Y=a^x$ mode q. a and q are two system constants and they are stored on the smart card. These Ys are exchanged between the readers, and reader A now calculates $K=Y_B{}^{X_A}$ mod $q=(a^X B)^{X_A}$ mod $q=a^{X_B X_A}$ mod q. If B treats $Y_A$ in the corresponding way both A and B will now share the common key K. this key is then used for encryption in a secondary encryption. Since both parties have been involved in generating the key a disclosure of the keys of one party will not disclose K. In addition, by varying X for each session, two sessions will never have the same key.

The various public keys should be readily available to all needing, e.g. to test a signature e.g. in a directory.

A problem with directories is the protection of the contents of the directory. If someone is able to manipulate the public key and mislead those who utilize the directory to use the wrong key, this someone can act as if he was someone else, e.g. mask himself. It is possible to protect the directory from this by the directory being physically and logically protected against manipulation. A secure communication channel directory then provides an adequate protection against most invaders.

However, a more elegant way is that the information in the directory in turn is signed by means of a digital signature. This is achieved by the individual records being signed by a certification authority, which can be viewed in the same way as the authorities issuing ordinary identifications who in fact warrant the authenticity of the identification. This authority should be responsible for the security of the system.

The above description of the directory function works excellently e.g. in a computer network or in other environments where the communication is readily established. However, in many situations this is not possible. If e.g. two facsimile apparatuses are about to identify each other they must have direct access to the public keys of each other. One way to solve this is that the various systems have the key directories stored locally in a safe manner (e.g in a smart card). The requirements on storage capacity may however be too large, but above all a problem arises when a new system comes into existence or when some system changes key/identity. Then every local directory has to be updated which can be a time-consuming procedure. In addition, there can be an interest in two systems being able to communicate with each other without previous contact. It should be sufficient that both are approved by a common certification authority for communication with each other The easiest way to solve this is letting the system exchanging their respective identities and the public keys with each other, signed by the common authority. Using this signature the various systems can check the authenticity of the identity of the others and the public key, without either previous or immediate contact with a third party. The important thing here is the possibility of a safe identification. As no third party is involved in the identification moment the identification procedure must be able to establish the identity with a 100 percent certainty of both parties. Every "masquerade" attempt should be made impossible.

All types of smart cards offer the possibility of protecting data fields using a personal code. These data fields may only be used by the proper user, the smart card not allowing access to these fields without the user having presented the right code. By protecting the key of the user's secret transformation in a public key system in such a data field, it is possible to presume with high reliability the authenticity of messages calculated using this transformation.

The problems associated with the above are mainly two. Partly, the equipment reading the key from the card or later handling it should not be able to be manipulated. In addition, this equipment must have the calculation capacity required for calculate exponents and divisions (modulo) of long numbers in an acceptable time. The first problem can be handled by the equipment being made secure or at least protected by the user in the same way as he/she protects his/her card. As the personal codes of the card often are handled in clear text inside this equipment this is another problem which has to be addressed. The calculation capacity may however be an even bigger problem, since the protection of the equipment only can be guaranteed relatively close to the card (in the card reader), where the calculation capacity often is limited.

One way to solve both problems simultaneously is to let the card as such take care of both the protection of the key and the calculations. This is increasingly more common and today exists in at least two types of smart cards. However, dependent on the choice of identification method, other requirements may be put on the smart card.

To perform an identification and exchange of keys at least five calculations of the type $a^x \bmod p$ are required. All five calculations are of the same type. In addition, this algorithm is built-in in at least two different commercially available smart cards. However, the cards differ as to the ability of calculating with generally selected a, x and p. The most common RSA calculation is the one with the secret key (D), in which case a is d and p is n. In our case, this is only one of the five calculations. In the other cases both x and b are totally different numbers.

Since the card reader is programmed to accept certain cards it is able to choose different methods of securing the identification.

In the most preferred embodiment of the invention the smart card calculates everything. In this type of card the secret part of the RSA key (e) is stored safely. In addition, the modulo variable n is stored permanently on the card, so that the card efficiently can perform $a^e \bmod n$ ($E_i(\ )$ as mentioned above). Additionally, the card can be supplied with general arguments for the RSA algorithm. Since the card is especially designed for calculating with RSA this is the fastest method seen overall. One can assume that one calculation takes maximally one second and, thus, the whole phase of identification and exchange of encryption keys (overhead excluded) will take maximally five seconds.

If the card is not capable of calculating using general arguments for the RSA algorithm the reader has to use its built-in algorithm for calculating everything else than $E_i(\ )$. This means no deterioration to the security, since precisely $E_i(\ )$ is the only thing critical from the security point of view. However, this means a reduced efficiency. An RSA calculation in the card reader takes approximately ten seconds. Since three of the five calculations in this case has to be performed by the reader the whole procedure will take approximately 35 seconds.

If the card is not capable of calculating with RSA at all the reader must take care of all the calculations. The variables (n and p) normally stored permanently in the card are read as data stored on the card in this method. The reader reads these variables from the card in calculating $E_i(\ )$. This means a substantial deterioration of the security, since the identity of the card can be manipulated in this way. The card and the data thereof are however still protected by the password of the card This is also the least efficient method. The total procedure for identification and exchange of encryption key takes approximately 50 seconds, which is experienced as annoyingly slow. The advantage is that any smart card can be used in this method.

For the reader to be able to be used it has to be activated by inserting one's smart card in the reader. Using the keyboard the password is then inputted to the card, which is opened. Thereafter the reader is ready to receive commands through the serial port or as DTMF signals on the telephone line. If a command enters through the serial port the reader will take the initiative for identification of the other reader. A command from the telephone line is the result of an initiative of the other reader.

The card reader is provided with a serial port. This serial port may be very simple and is capable of transmitting and receiving data in 9600 bps asynchronously, 8 data bits, no parity.

The apparatus controls the reader to perform identification and generation of encryption keys. Since both operations occur simultaneously there is only one command for the apparatus to the reader. The reader transmits a status message to the apparatus simultaneously with the communication with the opposite reader and, after the identification and generation of encryption key, also the result.

Between the two readers communication is accomplished by means of DTMF signalling and modem transmission The DTMF signalling is used to generate the initial contact. The reader that takes the initiative transmits the DTMF sequence "A66#". The other reader responds with the sequence "B66#", whereupon both readers are switched over to modem communication. In modem mode the identification and exchange of encryption keys will be performed. The reader who took the first initiative begins with transmitting in modem mode. Thereafter, the readers are communicating alternatively with each other, until the entire procedure is performed.

We claim:

1. A method of confirming the identity of and the exchange of encryption keys for a communication link between two communication apparatus each having a smart card reader for reading a first smart card at said first smart card reader and a second smart card at said second smart card reader wherein said first smart card reader is operatively coupled to a first communication apparatus and said second smart card reader is operatively coupled to said second communication apparatus comprising the steps of:

performing a read of a secure secret key from a first of said cards;

generating from inside said first smart card an encryption key for said communication link in response to said secure secret key;

providing an authenticating key from a precomputed and prestored value, stored within said first smart card a validation key based upon a secured common authority data base which at one time was common to said first and second smart cards;

authenticating the identity of said first communication apparatus by said second reader by virtue of said authentication key without transmitting the secret key based upon a calculation of said authentication key and information in said second smart card as to a key from said common authority data base;

reversing said performing, generating, providing and authenticating steps to establish the identify and key of said second communication apparatus with said first apparatus;

transmitting the encryption keys after the authenticity of said first communication apparatus has been established with said second communication apparatus and vice versa; and establishing a public key/private key communication link based upon the exchanged keys.

2. A method as in claim 1 wherein said establishment step comprises the step of:

sending facsimile data.

3. A method as in claim 1 wherein said step of providing comprises:

transmitting by DTMF tones.

4. A method as in claim 1 wherein said step of providing comprises:

transmitting by modem communication.

5. A method as in claim 1 further comprising the step of:

reading at least one of said smart cards in an reader integral to a telephone set.

6. A method as in claim 1 further comprising the step of:

reading at least one of said smart cards in an reader coupled in parallel with a telephone set.

7. A method as in claim 1 wherein said reversing step occurs concurrently with said first performing, generating, providing and authenticating steps.

* * * * *